Sept. 14, 1937.   J. LITHGOW   2,092,925
STERILE CONTAINER
Filed May 29, 1933
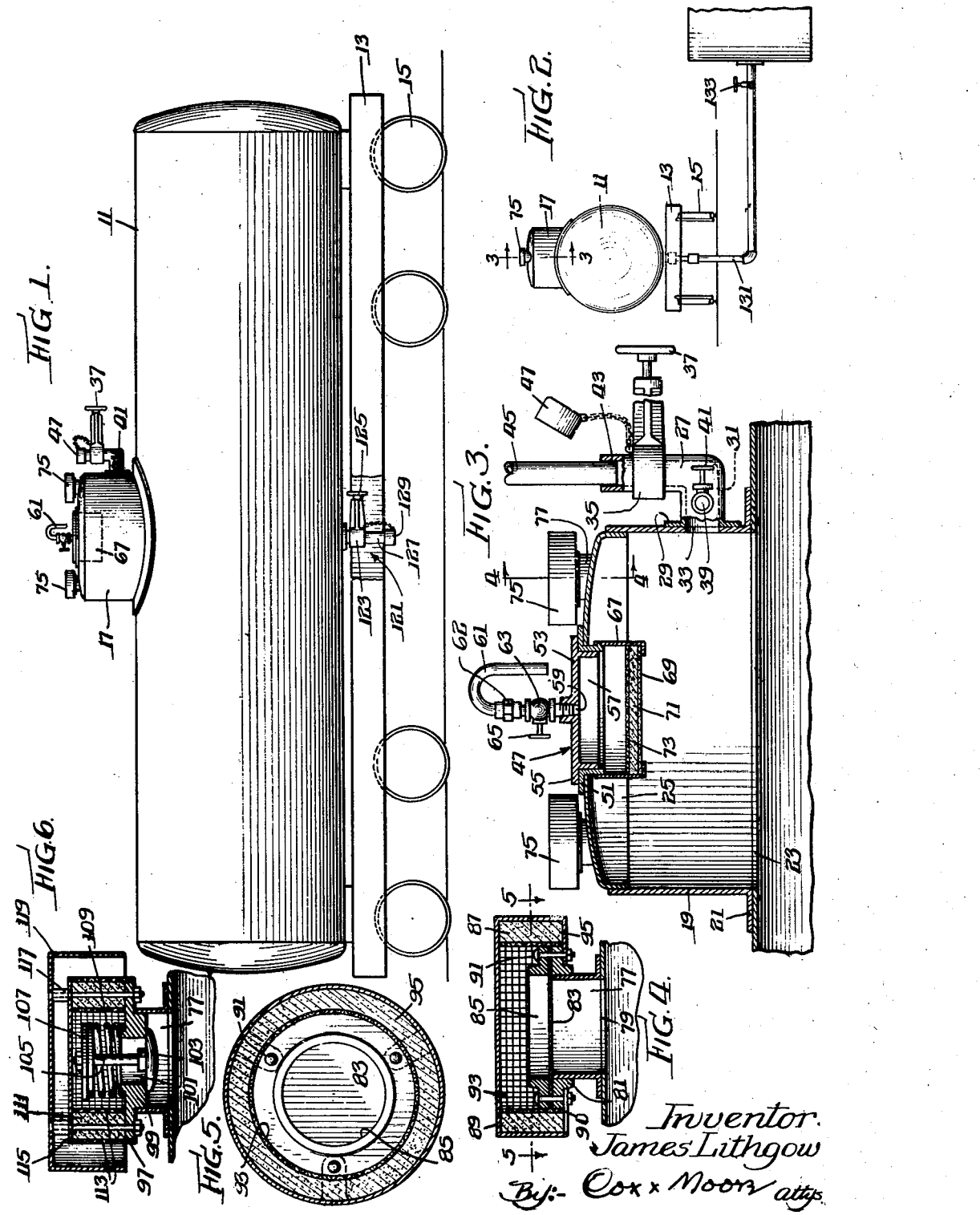
Inventor.
James Lithgow
By:- Cox x Moon attys Patented Sept. 14, 1937

2,092,925

UNITED STATES PATENT OFFICE 2,092,925

STERILE CONTAINER

James Lithgow, Chicago, Ill., assignor to North American Car Corporation, Chicago, Ill., a corporation of Illinois Application May 29, 1933, Serial No. 673,371

3 Claims. (Cl. 220—85)

My invention relates in general to the shipment of materials in sterile condition and has more particular reference to means for and method of shipping fluid material in a sterilized container, the invention relating more especially to the bulk transportation of liquids in tank cars or vehicles.

An important object of the invention resides in providing a container in which fermented mashes, sterilized wort, and other materials of like character may be loaded and transported and from which the materials may be discharged while being maintained at all times in sterilized condition, the container preferably being mounted on wheels to provide a mobile vehicle for the easy transportation of the material.

Another important object resides in the method of filling the container with the material to be transported while the same is relatively hot and then sealing the container and permitting the cooling of the material in the container to develop vacuum conditions within the container.

Another important object resides in providing suitable sealing means whereby the container may be made air-tight after being filled with the material to be transported.

Another important object resides in providing a vacuum release safety valve which normally hermetically seals the tank but which is adapted, when excessive vacuum conditions prevail within the tank, to admit sterilized air into the tank in order to relieve the excessive vacuum conditions and without contaminating the sterilized contents of the tank.

Another important object resides in providing a sterile air-inlet for allowing air to be admitted into the container in order to break the vacuum therein when it is desired to release the contents thereof at the delivery point.

Another important object resides in utilizing the sterile air-inlet as an outlet to permit the escape of air displaced by the material in loading the container.

Another important object resides in providing a loading valve through which the sterilized material may be introduced into the container and in providing means for sterilizing the loading valve immediately prior to the introduction of the sterilized material.

Another important object of the invention is to provide readily sterilizable receiving apparatus adapted to be used in conjunction with the carrying tank at the delivery point in order to receive the material discharged from the tank, said receiving apparatus being adapted to be sterilized and to sterilize the outlet connection on the tank immediately prior to the discharge of the sterilized contents of the tank.

Another important object resides in providing the container with a filling dome having the loading valve and its associated apparatus, the vacuum sealing and relief devices and the sterilized air-inlet built into the dome, which is preferably located at the top of the container and a discharge valve at the bottom of the container to facilitate the discharge of the contents of the tank by gravity.

Another important object of the invention resides in coating the interior surfaces of the tank with a sheathing of pitch, preferably applied in cold condition, in order to facilitate sterilization of the tank and to prevent corrosion and deterioration of the surfaces exposed to the sterilized contents.

Numerous other objects and advantages of the invention will be apparent from the following description, which taken in connection with the accompanying drawing, discloses a preferred embodiment of the invention.

Referring to the drawing:

Figure 1 is a side elevation of a railroad tank car embodying my present invention;

Figure 2 is an end view of the tank car shown in Figure 1, showing the car in position to discharge the contents of the tank into a sterilized receiver;

Figure 3 is a sectional view taken substantially along the line 3—3 in Figure 2 to illustrate the details of the filling dome;

Figure 4 is a view taken substantially along the line 4—4 in Figure 3 to show the details of the vacuum sealing and relief devices forming a part of the filling dome;

Figure 5 is a sectional view taken substantially along the line 5—5 in Figure 4; and Figure 6 is a sectional view similar to Figure 4 to illustrate a modified form of the vacuum sealing and relief devices.

To illustrate my invention, I have shown a standard railway tank car including, a preferably cylindrical tank 11 adapted to provide a receiver for storing materials in sterilized condition, the tank being provided with devices adapted to be easily maintained in sterilized condition and to facilitate the introduction and discharge of fluid materials into and from the tank and to maintain the materials in the tank at all times in a sterile condition.

The tank 11 is mounted firmly and securely upon a carriage 13 having wheels 15 to permit the tank to be transported readily from place to place. In the illustrated embodiment, the axis of the cylindrical tank is arranged in the direction of the movement of the carriage and the carriage is of the type utilized in railroad transportation.

The tank 11 may be formed of any suitable sheet material although I prefer to fabricate the tank by riveting together pre-formed sheet metal plates. The interior of the tank also is preferably coated with a layer of pitch applied to the sides of the container in substantially cold condition in order to render the tank surfaces, exposed to the tank contents, easy to sterilize and to eliminate corrosion. The seams of the tank also should be carefully sealed in a substantially hermetical manner in order to eliminate vacuum leaks and to prevent the ingress of air into the tank through the seams thereof when vacuum conditions prevail within the container.

The tank is also provided with a loading and sealing dome 17 preferably mounted on the top of the tank. The dome comprises a casing having preferably cylindrical walls 19, the lower ends of which are provided with outstanding flanges 21 which are riveted or otherwise secured to the walls of the tank at the peripheral edges of an opening 23. The seam between the flanged portions 21 and the walls of the tank 11 is also sealed to prevent vacuum leaks. The dome also has a cover 25, the edges of which are sealingly secured to the upper edges of the side walls 19 in order to provide a sealing compartment within the dome which communicates through the opening 23 with the interior of the tank. A loading valve 27 is sealingly secured to the wall 19 by means of the valve flanges 29. The valve 27 comprises preferably an elbow fitting, one arm of which is sealingly connected to the walls 19 by means of the flange 29, the fitting having a channel 31 therethrough which communicates with the interior of the dome through an opening 33 in the dome walls. The other arm of the fitting is provided with a gate valve 35 provided with manually operable hand wheel 37 and by means of which the channel 31 may be opened or closed. On the side of the gate valve 35 nearest the dome, the fitting 27 is provided with a valved, steam inlet-opening 39 controlled by the valve handle 41 while the fitting on the side of the gate valve remote from the dome has an opening 43 to which a hose or other conduit 45 may be attached for delivering to the loading valve 27 the material to be introduced into the tank. A cover 47 is also provided for closing the inlet opening 43 whenever the hose 45 is not connected to the loading valve.

The cover 25 has a preferably central opening, in which is mounted a sterilized air inlet fitting 47. This fitting comprises an annular collar 51 which is sealed permanently in the central opening of the cover and which, in turn, is adapted to receive a detachable cover 53. The cover 53 has an outwardly extending flange 55 adapted to overlie and seat upon the upper surfaces of the collar 51 and a downwardly extending annular flange 57 adapted to snugly seat within and sealingly engage the inner annular surfaces of the collar 51. Means is also provided for clamping the cover 53 on the collar 51. The cover is provided with a central opening 59 into which is threaded one end of a U-shaped pipe fitting 61. The other end of the pipe 61 extends downwardly toward the upper surface of the cover 53 and communicates with the outer atmosphere. The leg of the U-shaped pipe 61, which is connected to the cover 53, is provided with a manually operable valve 63 operable by means of the control handle 65 and by means of which communication between the outer and inner ends of the pipe 61 may be prevented or permitted at will.

The collar 51 within the dome is provided with a preferably cylindrical sheet metal basket 67, the upper end of which is attached to the collar 51, and the lower end of which is covered with wire gauze 69, or other air-pervious material. The basket 67, above the net 69, contains a filling 71 of any suitable air-pervious material, such as sponge rubber, felt, cotton waste, and the like, which is chemically treated with a disinfectant, or sterilizing medium in order to sterilize any air introduced into the dome through the cover 53.

In order to render the material 71 capable of sterilizing the air passing therethrough, I prefer to moisten the porous air-pervious filler 71 with a suitable disinfectant, such as a ten percent aqueous solution of carbolic acid, although any other suitable sterilizing medium may be utilized for this purpose. The basket 67 also contains a holding member 73, preferably a layer of wire-gauze or other suitable air-pervious material which overlies the porous layer 71 and holds the same in place within the basket 67.

The dome is also provided with one or more vacuum relief devices 75, the preferred forms of which are illustrated in Figures 4, 5, and 6 of the drawing. These relief valves comprise preferably cylindrical chimneys 77, the lower ends of which are sealed upon the dome cover 25 and communicate with the interior of the dome through openings 79 formed in the cover 25.

In the form illustrated in Figures 4 and 5, the upper end of the chimney 77 is provided with a flange 81 sealed to the upper end of the chimney 77, the upper surface being substantially flush with the upper end of the chimney.

A sheet of rupturable material, such as lead sheeting 83, overlies the upper surface of the flange 81 and an annular holding member 85 clamps the edges of the sealing disk 83 upon the upper surfaces of the flange 81. The disk 83 normally seals the dome from the outer air and yet should vacuum conditions in the container become excessive, the lead sheet will be exposed to the excessive pressure differential between the outside air and the reduced pressure within the dome and will fracture inwardly permitting air to enter the dome in order to relieve the dangerous vacuum condition. In order to prevent the air, so admitted into the dome after the sheet 83 fractures, from contaminating the contents of the tank, all of the air entering the dome through the chimney 77 is drawn through a sterilizing layer 87 of any suitable form but preferably of a character similar to the layer 71. To this end, the outer end of the chimney 77 is provided with a preferably sheet metal casing 89 comprising an inverted cup, the lower edges of the inverted cup casing 89 having inwardly extending lugs 90 which are secured to the flange 81 by means of the holding bolts 91 by which the collar 85 is also secured to the flange 81. The sterilizing layer 87 is mounted preferably annularly within the casing 89 in position such that any air drawn into the casing and delivered to the outer end of the chimney 77 must travel through the sterilizing layer 87. The sterilizing layer 87 is also preferably held in place in the casing 89 by means of an annular layer 93 preferably formed of wire gauze or other suitable air-pervious material, said annular gauze element 93 having a flange 95 resting upon the lugs 90 and held in place in the casing by said lugs.

In Figure 6 of the drawing, I have shown a slightly different kind of vacuum relief valve in which the inner end of the chimney 77 is provided with an annular collar 97 which is sealed to the upper end of the chimney 77 and having an internal portion 99. The portion 99 has a central opening 101 through which the interior of the chimney may be placed in communication with the outer atmosphere. This opening 101 is normally closed by an inwardly opening valve 103 adapted to seat upon the inner portions 99. The valve has a shank 105 extending through the opening 101 and provided with a bearing collar 107 above the collar 97. The valve is normally urged to closed position by means of a helical compression spring 109 which encircles the valve stem 105 and seats at its opposite ends respectively upon the upper surface of the collar portion 99 and on the collar member 107. The valve is thus normally closed by the spring 109 which will, however, yied to permit the valve to open under the influence of the differential pressure created by excess vacuum conditions within the container. In order to utilize the air admitted through the opening 101, when the valve 103 is open, an annular sterilizing layer 111, comprising an annular band of air pervious material chemically treated to sterilize the air passing through it and supported by inner and outer annular, preferably gauze, sustaining members 113, which are preferably mounted between the portions of the collar 97 and an impervious plate 115 in position to surround and enclose the outer end of the opening 101. The sterilizing device is secured in place by and between the peripheral portion of the collar 97 and the impervious plate 115 by means of clamp bolts 117. A cover 119 encloses the sterilizing layer in order to protect the same from dirt and atmospheric moisture.

An outlet connection 121 is provided preferably at the lowest point of the tank in order to permit the contents to be removed by gravity. This outlet comprises a fitting having a manually operable gate valve 123 controlled by means of the hand wheel 125, one side of the gate valve 123 communicating with the interior of the container 11 while its other side is connected with a discharge nozzle 127. A cover 129 is provided for the discharge nozzle to prevent the same from becoming clogged with dirt and other foreign matter when not in use.

In order to condition the container for loading, the valve 35 is closed and the valve handle 41 manipulated to deliver live steam into the interior of the container, the valve 123 being opened to permit the steam to escape. The steam sterilizes the interior of the container and also the valve 123 which is thereafter closed. The valve 35 is then opened and the cover 47 removed and live steam from the nozzle 39 completes the sterilization of the loading valve. The steam inlet 39 is then closed and the hose 45 connected to the loading valve. The cover 53 is then removed so that if the material is delivered through the loading valve into the compartment, the air and steam displaced thereby may escape through the basket 67 and the collar 51. In most cases, the material introduced into the tank will be in sterilized condition and will be delivered through the hose 45 directly from the sterilizer at a relatively high temperature, it being understood that to sterilize the material the same is heated to a temperature of approximately 212° Fahrenheit. The sterilized material, therefore, will ordinarily be introduced into the container at an appreciable temperature. After the tank is filled, the loading valve 35 is closed, the cap 47 applied to the open end of the loading valve connection and the cover 53 is applied and secured in place. The container is thus sealed completely and the contents of the tank in cooling will develop vacuum conditions within the tank. It is ordinarily desired to maintain these vacuum conditions and this will be accomplished in the device of my present invention. However, it is not practical to accurately control either the temperature of the material as fed into the container, nor the quantity of material forming a load. For this reason, the contents in cooling may develop excessive vacuum conditions within the container and, if no provision is made for pressure relief, will injure the storage tank.

The function of the pressure relief devices 75 is to permit air to be drawn into the container in order to relieve excessive vacuum conditions which may be set up within the tank without however contaminating the contents of the tank. Where the material is delivered to the tank in substantially cold condition so that no vacuum is created by the cooling of the contents to atmospheric condition, it may be desired to develop a vacuum condition in the tank. This may be accomplished by attaching the loading valve 27 to a vacuum pump after the tank is loaded and before the valve 35 is closed. Alternatively the outer end of the tube 61 may be removed at the coupling 62 and the suction pump attached at this point.

When it is desired to discharge the contents of the tank, the cover 129 is removed and the end of the discharge nozzle 127 is brought opposite the upper end of a receiving pipe 131 communicating with a reservoir or stationary storage receiver into which the contents of the tank are to be delivered. The receiving pipe 131 is provided with a valved steam inlet 133 and after the nozzle 127 is aligned with the pipe 131, steam is introduced through the valve inlet 133 and travels outwardly through the pipe 131 and impinges upon the nozzle 127 which is thus attached and sterilized at the same time that the pipe 131 is sterilized. The steam inlet 133 is then closed and the valve 123 is opened. The valve 63 also is opened permitting air to enter through the pipe 61 and through the sterilizing layer to break the vacuum within the container and permit the contents of the tank to flow out through the delivery nozzle 127 and into the receiving connection 131.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages, the forms herein described being preferred embodiments for the purpose of illustrating my invention.

Having thus described my invention, what I claim as new and desire to secure by Letters Patent is as follows:

1. In a railway tank car including a wheeled truck and a tank mounted thereon, said tank having a discharge outlet pipe at the bottom thereof, and a discharge valve for said outlet pipe; an expansion dome mounted on the tank, said dome being disposed centrally of the tank and rising upwardly from the top thereof so as to provide a relatively large expansion chamber above the liquid level of the normal capacity of the tank when full, said dome above the liquid level in said tank having an opening, a loading fitting for said opening having an inlet adapted for connection to a source of liquid media, a control valve mounted in said fitting between said loading inlet and the opening into said dome, a steam inlet connection disposed in said fitting between said control valve and said opening in said dome, a control valve for said steam connection, said dome having in communication with the expansion chamber therein a relatively large opening, and means for normally closing said opening, said dome having an air inlet, a control valve for said air inlet and porous sterilizing medium for said air inlet to sterilize air passing into said dome from without said tank.

2. In a railway tank car including a wheeled truck and a tank mounted thereon, said tank having a discharge outlet pipe at the bottom thereof, and a discharge valve for said outlet pipe; said tank having a centrally disposed upstanding dome providing an expansion chamber above the normal full liquid level in said tank car, said dome having a valve controlled inlet for loading said tank car with a sterile hot liquid, means for admitting steam into said loading inlet and thence into said tank for completely sterilizing said inlet, its valve and the tank prior to loading said tank, a valve for controlling the steam, means for discharging displaced air and steam from said tank through said dome during the filling of said tank with said sterile liquid, means for sealing said dome whereby upon cooling of said liquid to produce a vacuum within in said expansion dome above the liquid level in said tank, said dome having means for admitting sterilized air into said tank car to effect a flow of liquid through said discharge outlet, said dome having a pressure relieving means to relieve excessive pressure created in said dome and expansion chamber.

3. In a railway tank car including a wheeled truck and a tank mounted thereon having a valve controlled discharge outlet at the bottom thereof; said tank having a centrally disposed expansion dome rising above the top of said tank and providing a relatively large expansion chamber disposed above the liquid level of the tank when full, said dome having means for filling the tank with sterilized liquid, said dome having a relatively large opening in its top, said opening having completely thereacross a porous antiseptic medium, a closure for said opening, said closure having a valve controlled air inlet for permitting air to enter the dome through the antiseptic medium to effect the flow of liquid through the discharge outlet, and means in said dome for sterilizing the liquid inlet and the inner wall of said tank and dome with steam.

JAMES LITHGOW.